Figure 1:
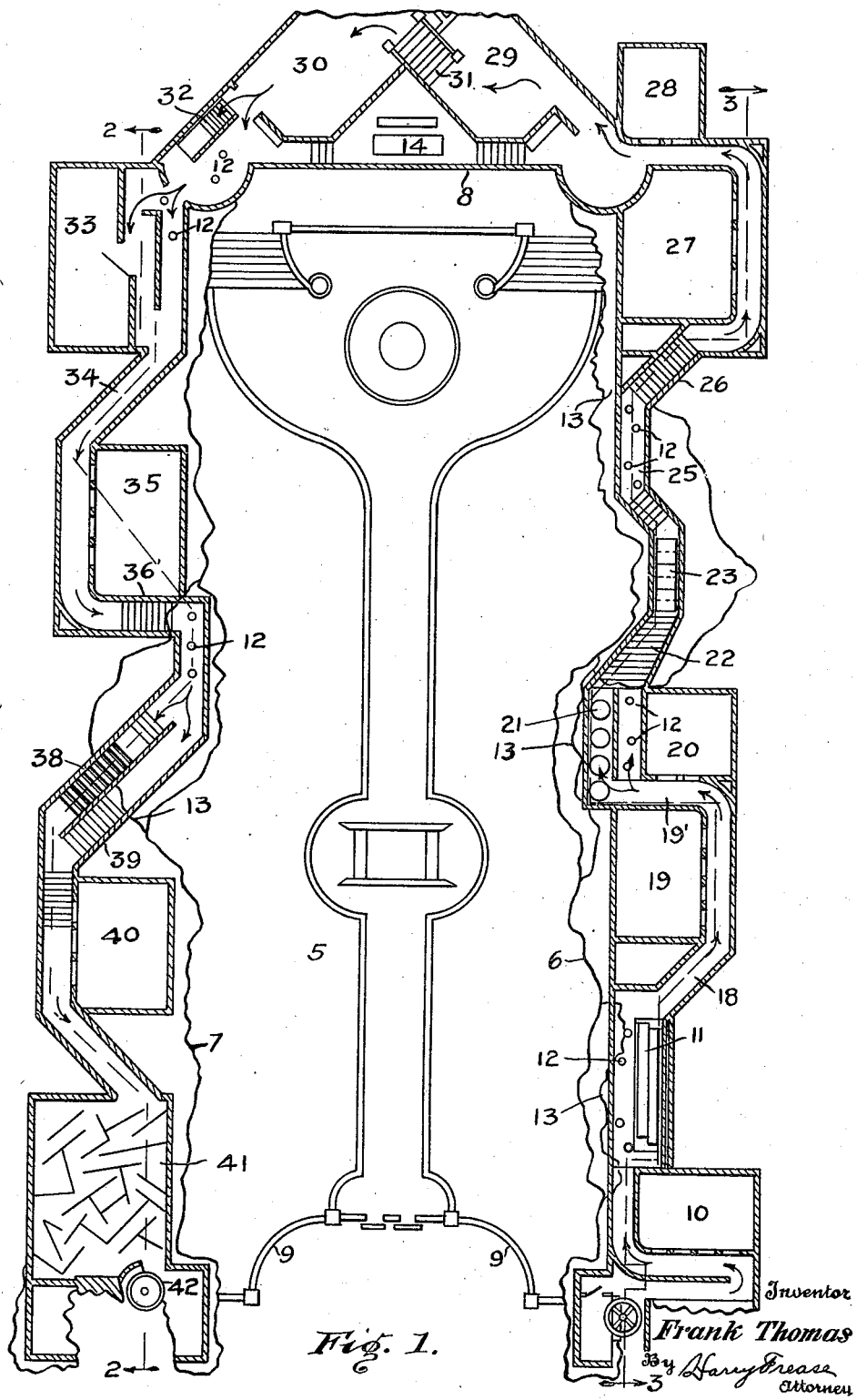

Dec. 10, 1929.  F. THOMAS  1,738,752
AMUSEMENT HOUSE
Filed May 13, 1929  2 Sheets-Sheet 1

Inventor
Frank Thomas
By Harry Frease
Attorney

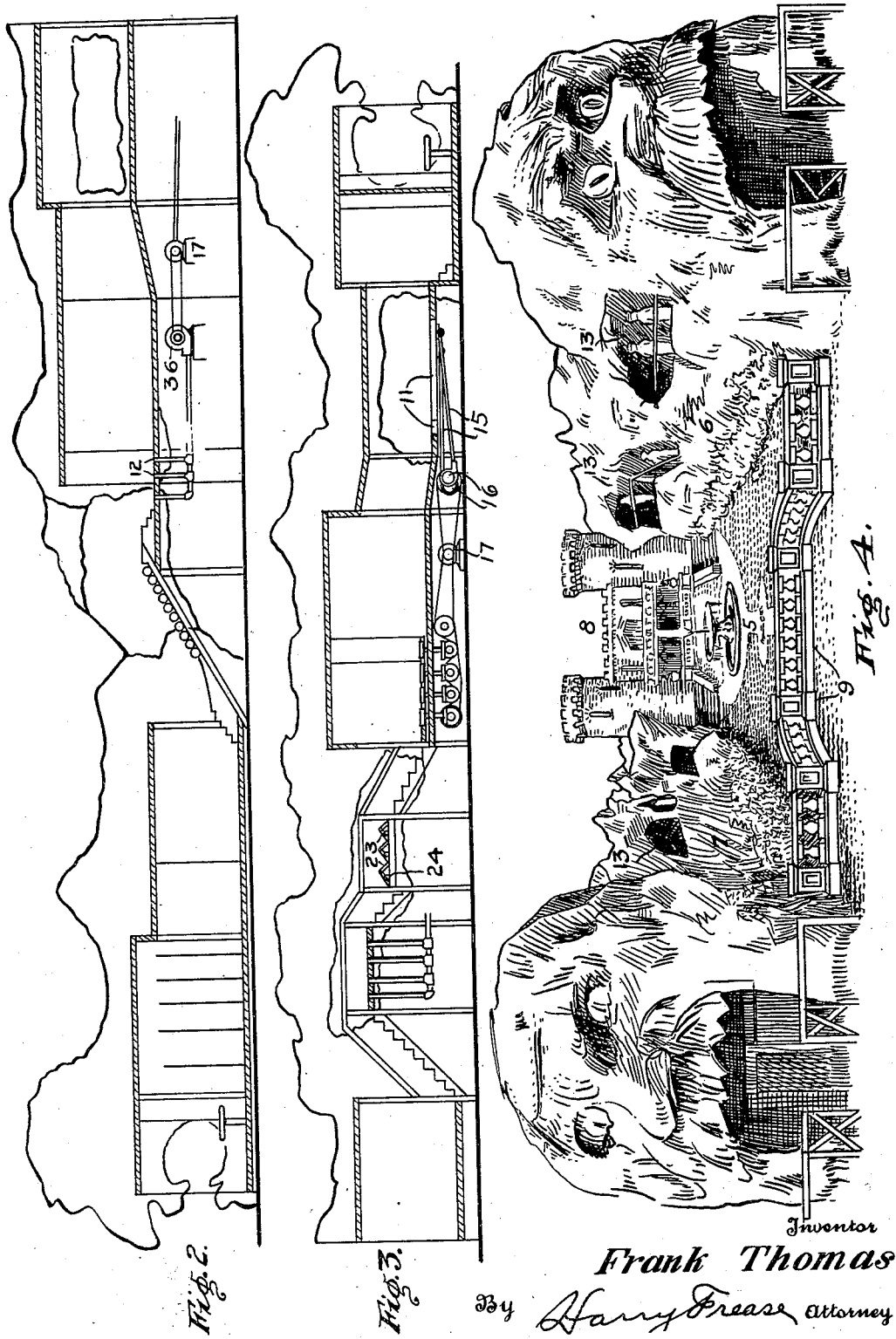

Patented Dec. 10, 1929

1,738,752

UNITED STATES PATENT OFFICE

FRANK THOMAS, OF INDIANAPOLIS, INDIANA

AMUSEMENT HOUSE

Application filed May 13, 1929. Serial No. 362,748.

This invention relates to amusement houses such as are erected in parks and playgrounds for the entertainment of the public and the object of this invention is to provide a house which will be a representation of Bluebeard's castle in weird and fantastic outward appearance, having an inside passage with an entrance at one end and an exit at the other, said passage to be traveled by pedestrians upon payment of an admission fee and to present obstacles and sensational features to be walked over, through or past rooms of horror in keeping with the Bluebeard legend, to be gazed at by the tourists.

Another important object of the invention is to provide an attractively landscaped vista, court, or ballyhoo, closed on two sides and at the far end by walls of rock and masonry, and from which the public is excluded by a railing or balustrade at the near or front end, but which the people can readily see over, and to expose the tourists travelling the passage ways in the structure, to view of the people outside of the balustrade, at intervals in order to excite the interest and curiosity of the latter and induce them to also become tourists.

A further object is to provide a perfectly safe by-pass around tread mills, revolving disks, shuffle boards, and the like hazards in the tourists' passages for the optional use of elderly people and all who are timid or prefer to be spectators instead of actors thereon.

A still further object is to inject jets of air under pressure through the floor over which tourists are passing, generally at one or more of the situations where they are exposed to view from the outside, and to provide a station from which these places are visible and means of air-control at that station, whereby an operator there can turn the air on suddenly to increase the surprise when he sees the tourists are standing over the compressed air nozzles.

I accomplish the above, and other objects which will hereinafter appear, by the means indicated in the accompanying drawings, in which—

Fig. 1 is a plan sectional view of my invention;

Fig. 2, a vertical sectional view on line 2—2, Fig. 1;

Fig. 3, a vertical sectional view on line 3—3, Fig. 1; and

Fig. 4, a front perspective view of my invention.

Like characters of reference indicate like parts in the several views of the drawings.

The vista, court, ballyhoo, or enclosure 5, by whatever name called, is defined upon two sides by walls 6 and 7, here shown of irregular form made out of canvas and painted to imitate stone. These are connected at their far ends by a closure 8, in imitation of a castle, and at their near or front ends by a balustrade 9 which excludes the public from the enclosure 5, while allowing an unobstructed view of it and its surrounding walls.

The enclosed area 5 is attractively landscaped in any suitable manner.

Back of the walls 6 and 7 and castle front 8, is a winding passageway through which people known as tourists are permitted to walk single file in the direction indicated by the arrows upon the payment of an admission fee. The entrance and exit are here shown as through the mouths of gigantic heads, constructed according to the artist's fancy to represent his conception of the head of the fabled Bluebeard.

Entering the head at the right the traveler passes the turnstile and around the partition screen as indicated by the arrow, in front of Bluebeard's reception room 10, the wall of which has openings through which he can look only, and in which are furnishings calculated to send an unexpected thrill of horror through the tourist. Beyond the room 10 the tourist may pass over a floor having shuffle boards 11 or through a passage beside them having nozzles 12 through which air under pressure is discharged.

An opening is formed in the wall 6 opposite the air nozzles as shown by the line 13, so an operator stationed at 14, in the castle, can see the tourists whereupon he surprises them by turning on the air. The shuffle boards which were optional to the tourist comprise a pair of boards 11 arranged longitudinally of the passageway, reciprocated in alternate opposite directions by piston rod connections 15 (see Fig. 3) with corresponding eccentrics 16 rotated by belt connection with a motor 17. From thence the tourist ascends a ramp 18 and passes a room 19 known as Bluebeard's mess hall showing the gruesome human viands, etc., through openings which the tourist passes without entering the room, and turning the corner he climbs another ramp 19' and passes a room 20, which is Bluebeard's kitchen, furnished and decorated in keeping with the sanguinary character of the fabled owner.

Passing the kitchen the tourist has the option of walking over the four revolving discs 21 or through the way with air nozzles 12, through which the operator may supply compressed air in the manner previously described. The wall 6 is open as shown by line 13 to expose the tourist to view on the discs or over the air.

Next the tourist climbs a stairs 22 to a platform having trip boards 23. These, as shown in Fig. 3, are a series of boards hinged together at their adjacent edges and supported on pivots 24 normally in V-formations that reverse when trod upon. The tourist passes thence to a walk 25 through the floor of which compressed air is discharged through nozzles 12 as previously described. He descends a stair 26 and passes outside of room 27 which is Bluebeard's wine cellar into which he can look at appropriate decorations and stores. Crossing the far end of the wine cellar the tourist passes and has a glimpse into room 28 which is Bluebeard's bath room, and next he crosses to the other side of the main enclosure through the two rooms 29 and 30 of the castle. The walls of these rooms are properly at right angles with their floors but the floors are oblique to the horizontal, each floor at a different angle connected by stairs 31.

Exit from the castle is over a tread mill 32 or over a floor with air nozzles 12, to a passage leading past a room 33 called the chamber of horrors in which are decapitated bodies, heads and relics of Bluebeard's gruesome amours. Those who do not care to view this chamber can pass through a hallway equipped with air nozzles 12 and down a ramp 34 past Bluebeard's bed room 35, thence up a stairs 36' to a passageway in full view of the public and the operator, through the floor of which compressed air is discharged through nozzles 12. This air blast like the others is preferably supplied from a blower 36 (see Fig. 2) operated by an electric motor, wired to a switchboard 14 in the castle.

The tourist next descends a sloping runway having a series of transverse rollers 38 covered with Brussels carpet for a tread, or he can descend a stairs 39 beside the rollers. In either event he next passes Bluebeard's den 40 and is appropriately thrilled by a look within and from there is ushered into room 41 which may be furnished with numerous mirrors set to form a maze from which he makes his exit after much confusion and difficulty past a turnstile 42 to the street where he joins the crowd in watching for glimpses through the openings in the walls 6 and 7 of tourists following him.

It is obvious that many departures are possible in arrangement and number of sensation devices and in the decorations of my show house. In fact the size and character of the ground upon which it is erected varies for different localities and I therefore do not desire to be limited to the arrangement here shown and described nor any more than is required by the appended claims.

The amusement house or structure set forth in this application for patent is a continuation in part of the common subject matter of my prior application for patent for design for Amusement houses, Serial No. 19,693, filed November 12, 1926.

As best illustrated in Figs. 1 and 4, the walls or tunnels 6 and 7 and the end closure castle or tunnel 8 comprise a U shaped tunnel or passageway, having openings in the inner walls of the U, so that the tourist passing through the tunnel or passageway will be visible to the public looking between the front ends of the U walls or legs 6 and 7.

I claim:

1. An amusement structure having a land area closed by barriers from external view on both sides and rear end and open at top and from which area the public is excluded by a balustrade at its front end over and from which the enclosed area is visible, a plurality of trick and emotion producing devices arranged in a series along both sides and rear end of the land area beyond the barriers and a passageway for tourists connecting the trick and emotion devices in series and which all persons entering the structure must traverse.

2. An amusement structure having a land area open to the sky at the top but closed by barriers from external view on both sides and rear end and from which the public is excluded by a balustrade at its front end over and from which the enclosed area is visible, a plurality of trick and emotion producing devices arranged in a series along both sides and rear end of the land area beyond the barriers, a passageway for tourists connecting the trick and emotion devices in series which all persons entering the structure must traverse, said land area enclosing barriers screening the passageway and devices from view from the balustrade but said barriers having sight openings at intervals through which tourists traversing the passageways opposite said openings may be seen from the balustrade.

3. An amusement structure having a land area open to the sky at the top but closed by barriers from external view on both sides and rear end and from which the public is excluded by a balustrade at its front end over and from which the enclosed area is visible, a plurality of trick and emotion producing devices arranged in a series along both sides and rear end of the land area beyond the barriers, a passageway for tourists connecting the trick and emotion devices in series which all persons entering the structure must traverse, said land area enclosing barriers screening the passageway and devices from view from the balustrade but said barriers having sight openings at intervals through which tourists traversing the passageways opposite said openings may be seen from the balustrade, and means for discharging air under pressure through the floor of the passageway at one or more of said openings.

4. An amusement structure having a land area open to the sky at the top but closed by barriers from external view on both sides and rear end and from which the public is excluded by a balustrade at its front end over and from which the enclosed area is visible, a plurality of trick and emotion producing devices arranged in a series along both sides and rear end of the land area beyond the barriers, a passageway for tourists connecting the trick and emotion devices in series which all persons entering the structure must traverse, said land area enclosing barriers screening the passageway and devices from view from the balustrade but said barriers having sight openings at intervals through which tourists traversing the passageways opposite said openings may be seen from the balustrade, means for discharging air under pressure through the floor of the passageway at one or more of said openings and means for selectively controlling said discharge from a single station.

5. An amusement structure having an area open to the sky at the top but closed from external view on three sides and from trespass but not vision on the fourth side, entertainment devices located outside of the closed area on the first three sides connected by a tourists passage and sight openings through which tourists traversing said passage are visible from the fourth side only.

6. An amusement structure having an area open to the sky at the top but closed from external view on three sides and from trespass but not vision on the fourth side, entertainment devices located outside of the closed area on the first three sides connected by a tourists passage, sight openings through which tourists traversing said passage are visble from the fourth side only, motion stimulating devices at the sight openings and means for manually actuating said last devices when tourists are near them.

7. An amusement structure having a passageway for tourists through which all entering the structure must pass, rotating disks tread mills, carpeted cylinders and the like trick devices in the passageway requiring athletic movement of the tourists, and a by-pass around said devices for the optional use of the tourist having none of said athletic movement requiring devices therein.

8. In an amusement structure having a closed area, with sight openings through which those on the outside of the structure may look in a castle at one end having one or more rooms the floors of which are oblique to a horizontal plane, a passageway entering the castle at one end through the area closure on that side and a passageway leading from the other end of the castle through the area closure on the other side said passageways being separated by a roofless grass-plot, furnished and decorated rooms beside the passageways the interiors of which are visible to tourists travelling the passageways but not to others, trick and fun-making devices in the passageways to additionally amuse and divert the tourists who are visible only through the sight openings to the outside public.

9. An amusement structure having an area open to the sky at the top but closed from external view on three sides and exposed to vision on the fourth side, entertainment devices located outside of the open area on the first three sides connected by a tourists' passage and sight openings through which tourists traversing said passage are visible from the fourth side only.

In testimony that I claim the above, I have hereunto subscribed my name.

FRANK THOMAS.